United States Patent [19]

Nunan et al.

[11] Patent Number: 6,013,313

[45] Date of Patent: Jan. 11, 2000

[54] METHODS FOR MAKING HIGHLY DISPERSED HOMOGENEOUS COMPOSITIONS

[75] Inventors: John G. Nunan, Tulsa, Okla.; Scott Campbell, Worthington, Ohio

[73] Assignee: ASEC Manufacturing General Partnership, Catoosa, Okla.

[21] Appl. No.: 09/164,398

[22] Filed: Sep. 30, 1998

Related U.S. Application Data

[62] Division of application No. 08/803,078, Feb. 20, 1997
[60] Provisional application No. 60/012,014, Feb. 21, 1996.

[51] Int. Cl.[7] .................................. B32B 5/16; B05D 7/00
[52] U.S. Cl. ........................... 427/214; 427/216; 428/323; 428/403; 428/913
[58] Field of Search ...................................... 427/214, 216; 428/323, 403, 913

[56] References Cited

U.S. PATENT DOCUMENTS

| | | |
|---|---|---|
| 3,243,368 | 3/1966 | Mulasky . |
| 3,321,328 | 5/1967 | Herman . |
| 4,016,218 | 4/1977 | Haag et al. . |
| 4,325,994 | 4/1982 | Kitashima et al. . |
| 4,374,296 | 2/1983 | Haag et al. . |
| 4,418,235 | 11/1983 | Haag et al. . |
| 4,440,871 | 4/1984 | Lok et al. . |
| 4,554,143 | 11/1985 | Messina et al. . |
| 4,567,029 | 1/1986 | Wilson et al. . |
| 4,666,875 | 5/1987 | Pellet et al. . |
| 5,559,073 | 9/1996 | Hu et al. . |

FOREIGN PATENT DOCUMENTS

| | | |
|---|---|---|
| 063836 A1 | 2/1995 | European Pat. Off. . |
| 2045612 | 3/1971 | France . |
| 2086903 | 12/1971 | France . |
| 222533 A6 | 12/1973 | Germany . |

OTHER PUBLICATIONS

J. N. Miale, et al., Catalysis by Crystalline Aluminosilicates, 1966, Journal of Catalysis, vol. 6, pp. 278–287.

Ph. Courty, et al., Oxydes Mixtes ou en Solution Solide sous Forme Tres Devisee Obtenue par Decomposition Thermique de Precurseurs Amorphes, 1973, Powder Technology, vol. 7, pp. 21–38.

D. H. Olsen, et al., Chemical and Physical Properties of the ZSM–5 Substitutional Series, 1980, Journal of Catalysis, vol. 61, pp. 390–396.

H. J. Robota, et al., Physicochemical Properties of Ce–Containing Three–Way Catalysis and the Effect of Ce on Catalytic Activity, 1992, Journal of Catalysts, vol. 133, p. 309.

*Primary Examiner*—Nathan M. Nutter
*Attorney, Agent, or Firm*—Kuffner & Associates

[57] ABSTRACT

The present invention discloses a method of making materials and coatings formed from multiple component compositions characterized by improved uniformity, improved dispersion and/or improved homogeneity on the atomic, nanometer, or sub micron scale. These compositions are prepared by forming a mixture of component precursors in the presence of at least one suitable organic reagent and a solvent. Suitable reagents include those in which the sum of the hydroxy and carboxy groups contained in their molecular structure is at least two, which form a rigid, gel-like matrix upon suitable treatment and which decompose completely at high temperatures, leaving no residue. This method is useful for making compositions that are useful in the production of ceramics, supports, catalysts, modified supports, electronics, coatings, films, laminates, superconductors and similar products.

20 Claims, 11 Drawing Sheets

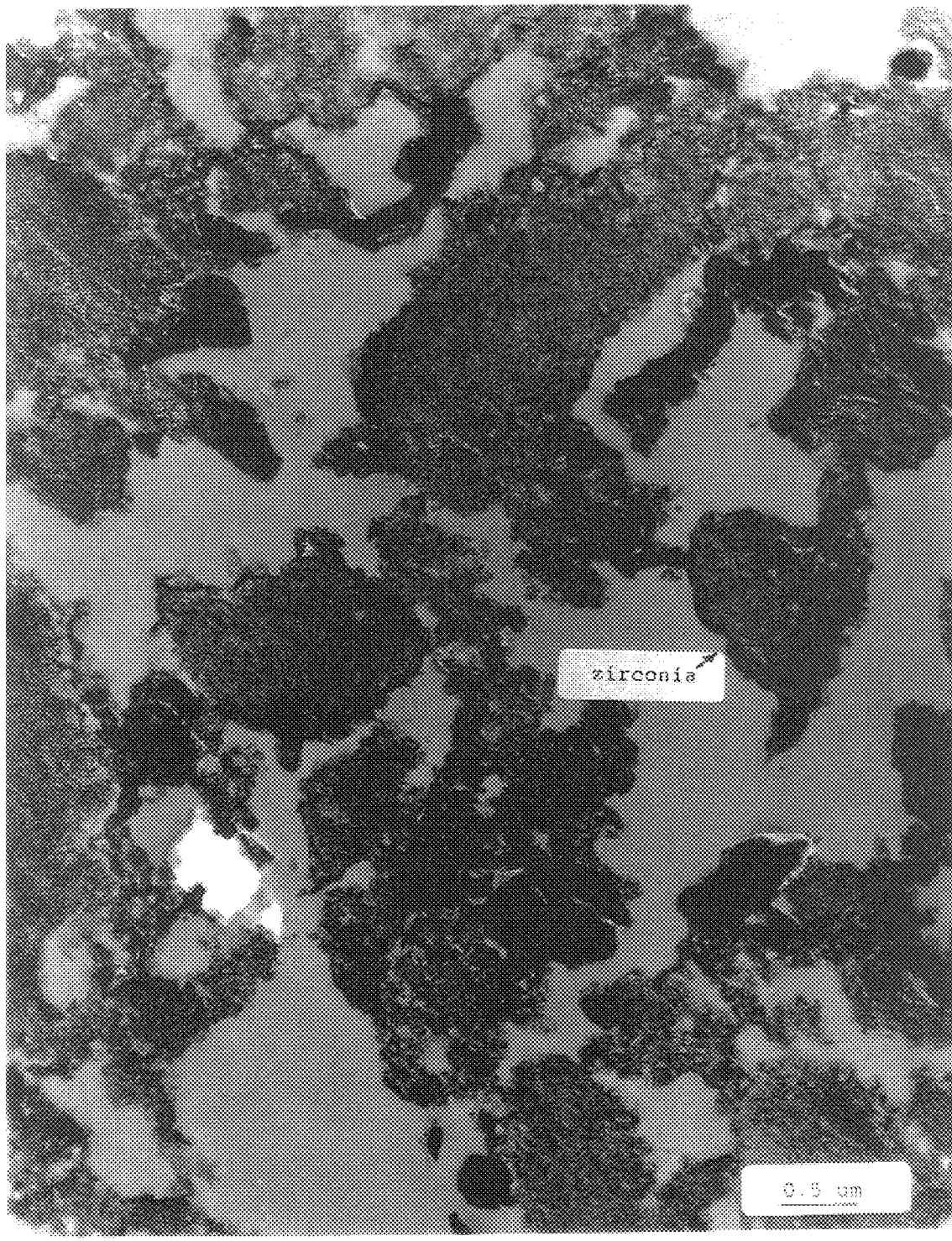
Figure 1 TEM picture of 10%Zr/γ-Al₂O₃ prepared from Zr acetate after air calcination at 600°C

Figure 2 TEM picture of the Rh,10%Zr/γ-Al₂O₃ sample after aging at 1200°C for 6 hours in 10%H₂O/90%N₂ Support impregnated with ZrO(NO₃)₂
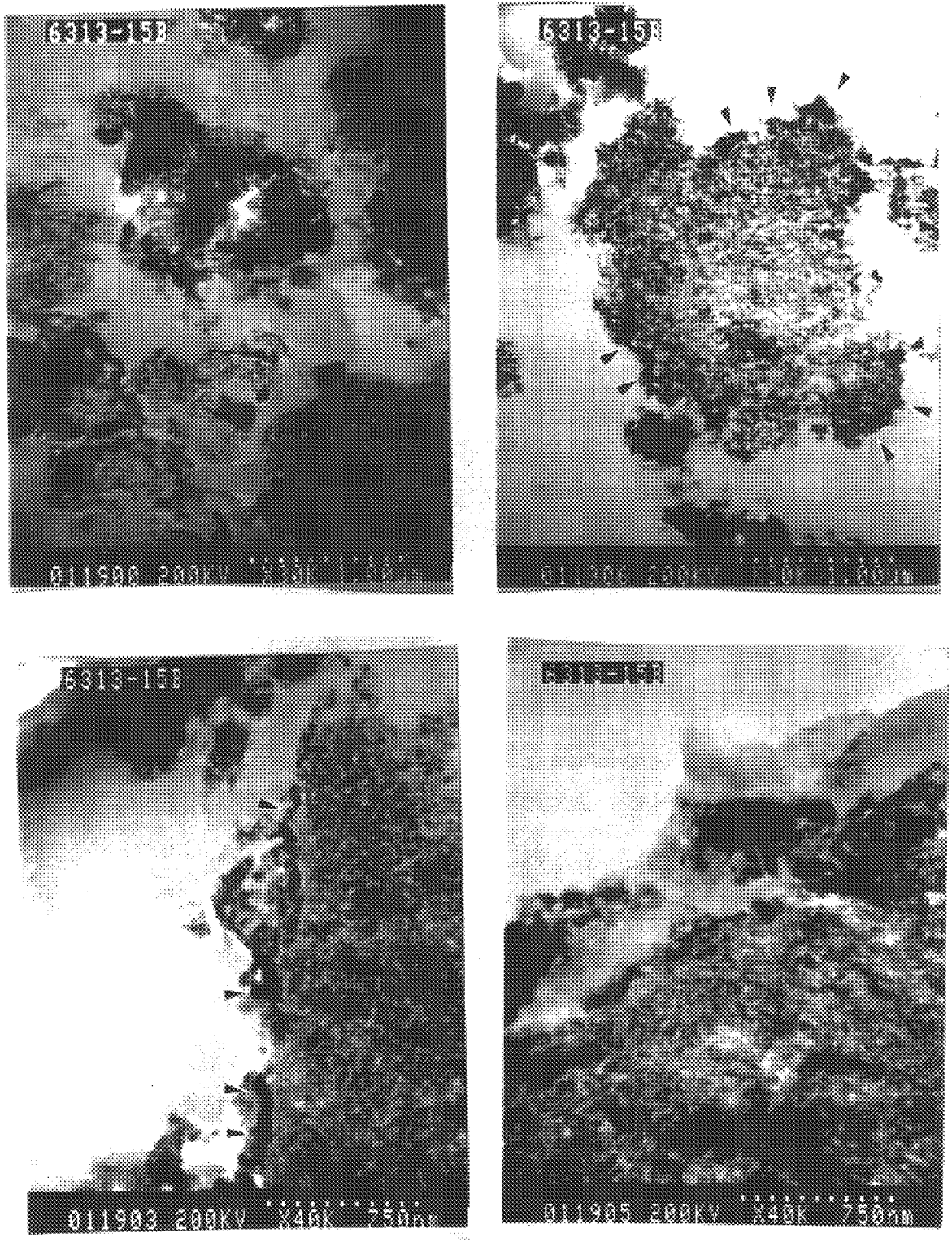

Figure 3 TEM picture of the 12%Zr/$\gamma$-Al$_2$O$_3$ sample after calcination in air at 600°C
Support impregnated with ZrO(NO$_2$)$_2$/citric acid

Figure 4 TEM pictures showing very even coating of Nextel 440 fibers with boron nitride
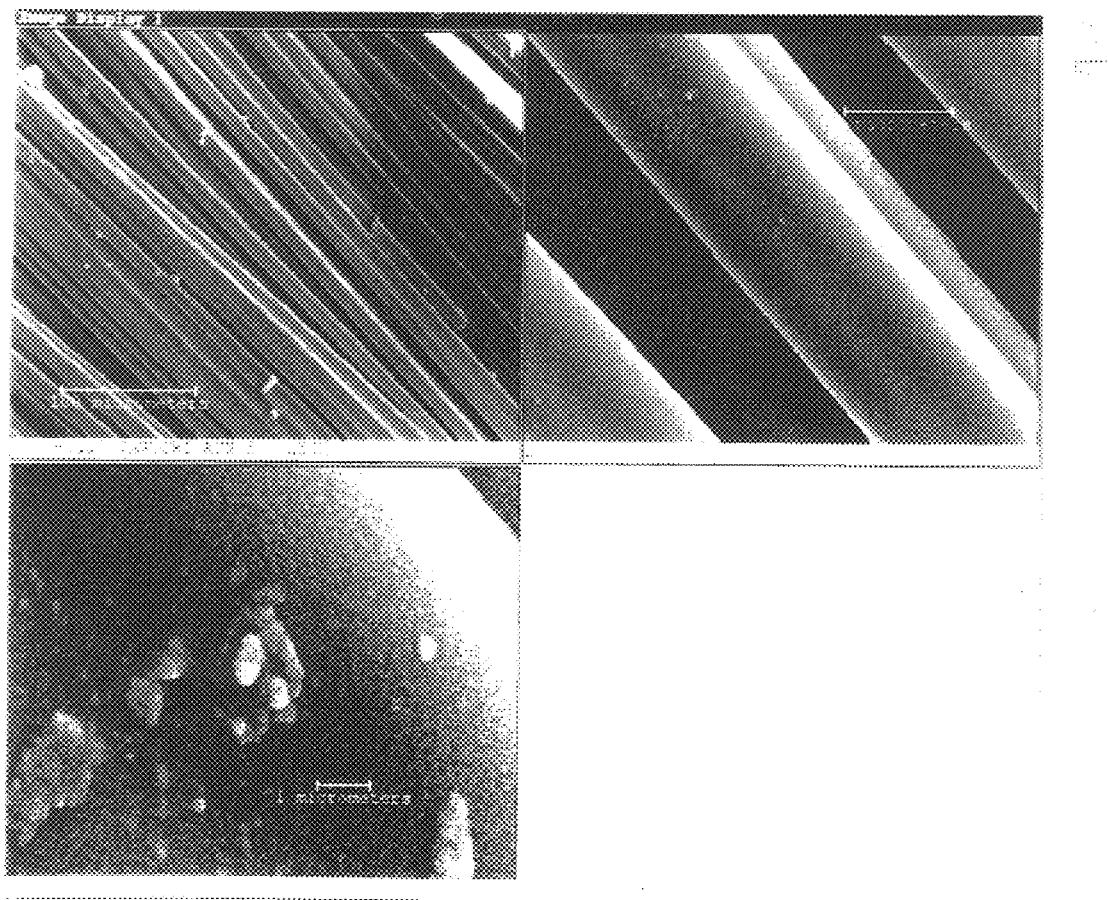

Figure 5 TEM pictures showing very even coating of silica fibers with $ZrO_2,Y$
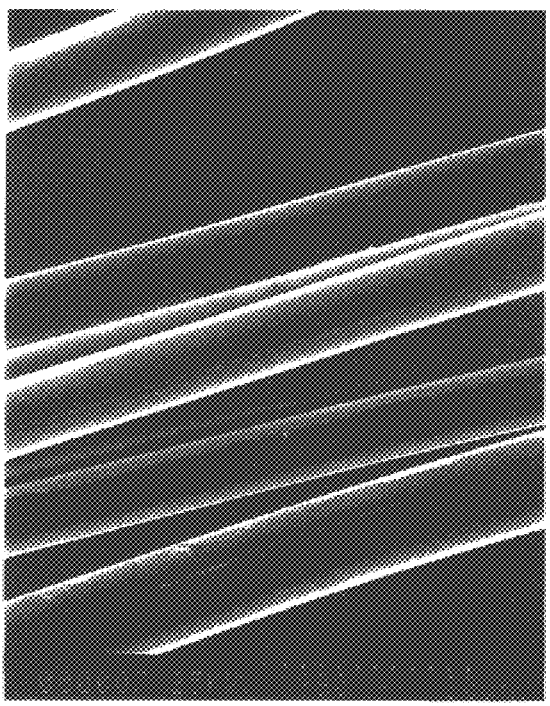

Figure 6 TEM picture of Ba, Ce/$Al_2O_3$ prepared from Ba acetate, Ce colloid and alumina sol with the inclusion of d-sorbitol after air calcination at 600°C
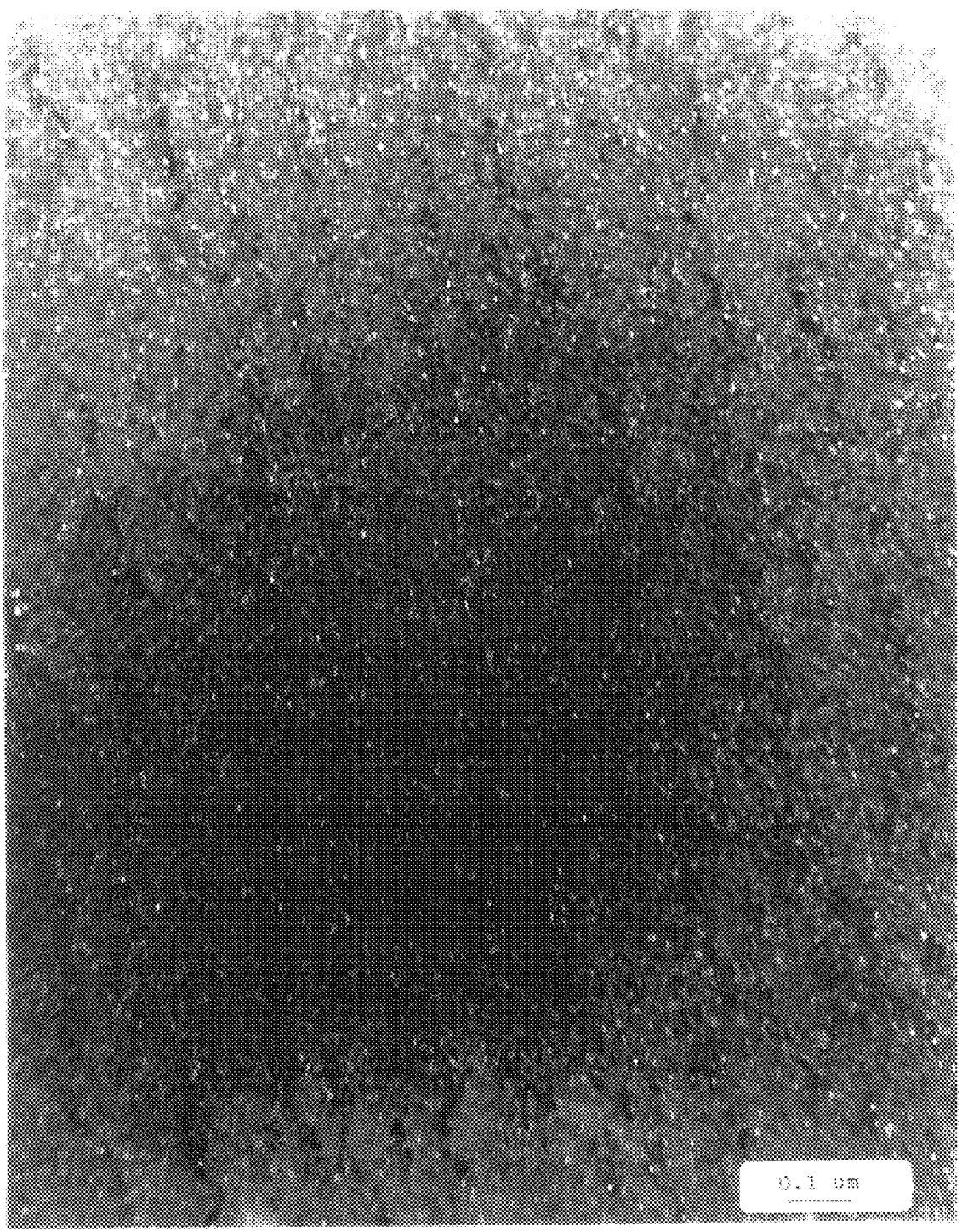

Figure 7 TEM picture of La, Ce/Al$_2$O$_3$ prepared from La acetate, Ce colloid and alumina sol with the inclusion of d-sorbitol after air calcination at 600°C

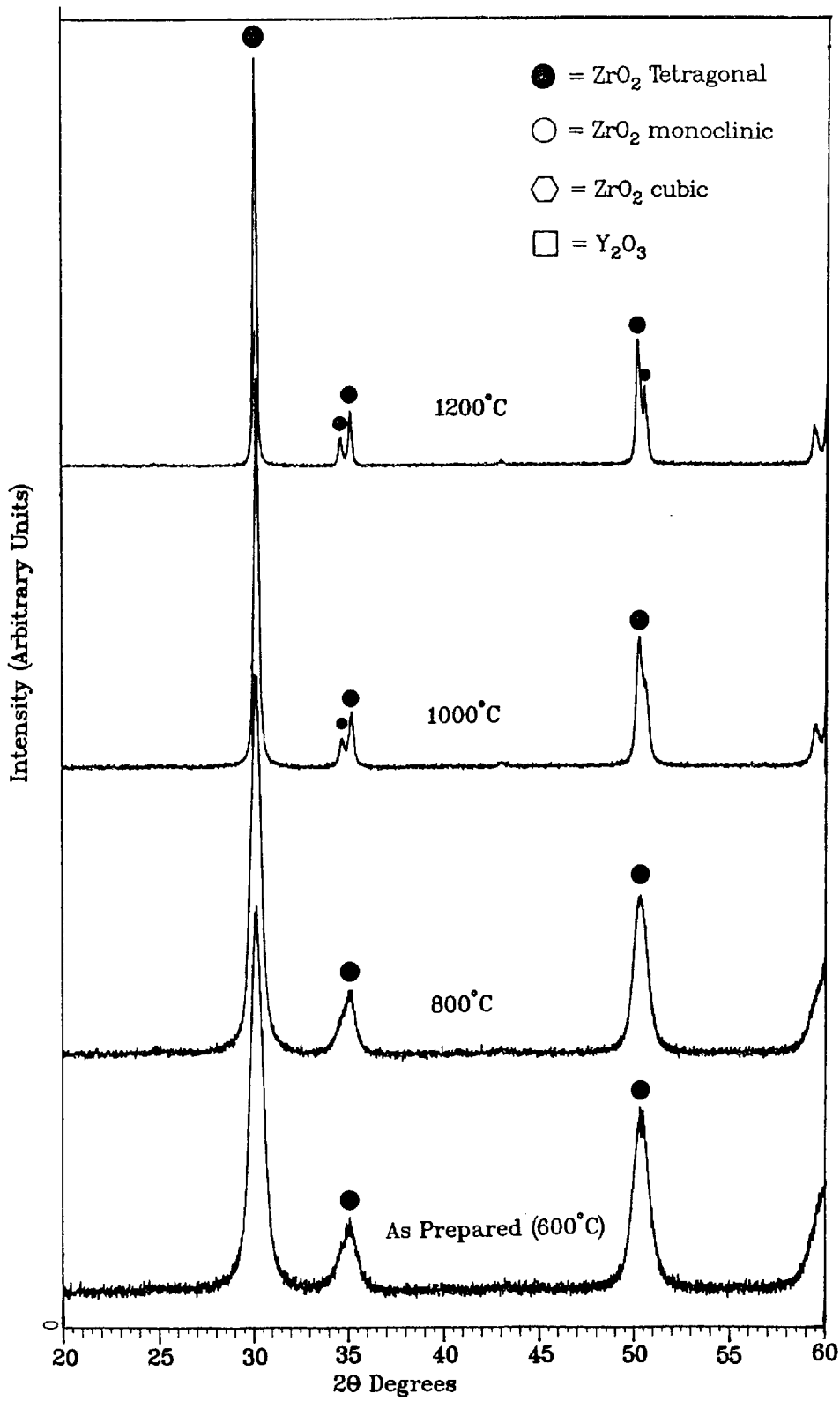
Figure 8. XRD patterns of Y/ZrO$_2$ prepared using the d-sorbitol process as a function of aging severity.

Figure 9. XRD patterns of two commercial Y/ZrO$_2$ samples made by state-of-the-art co-precipitation procedures
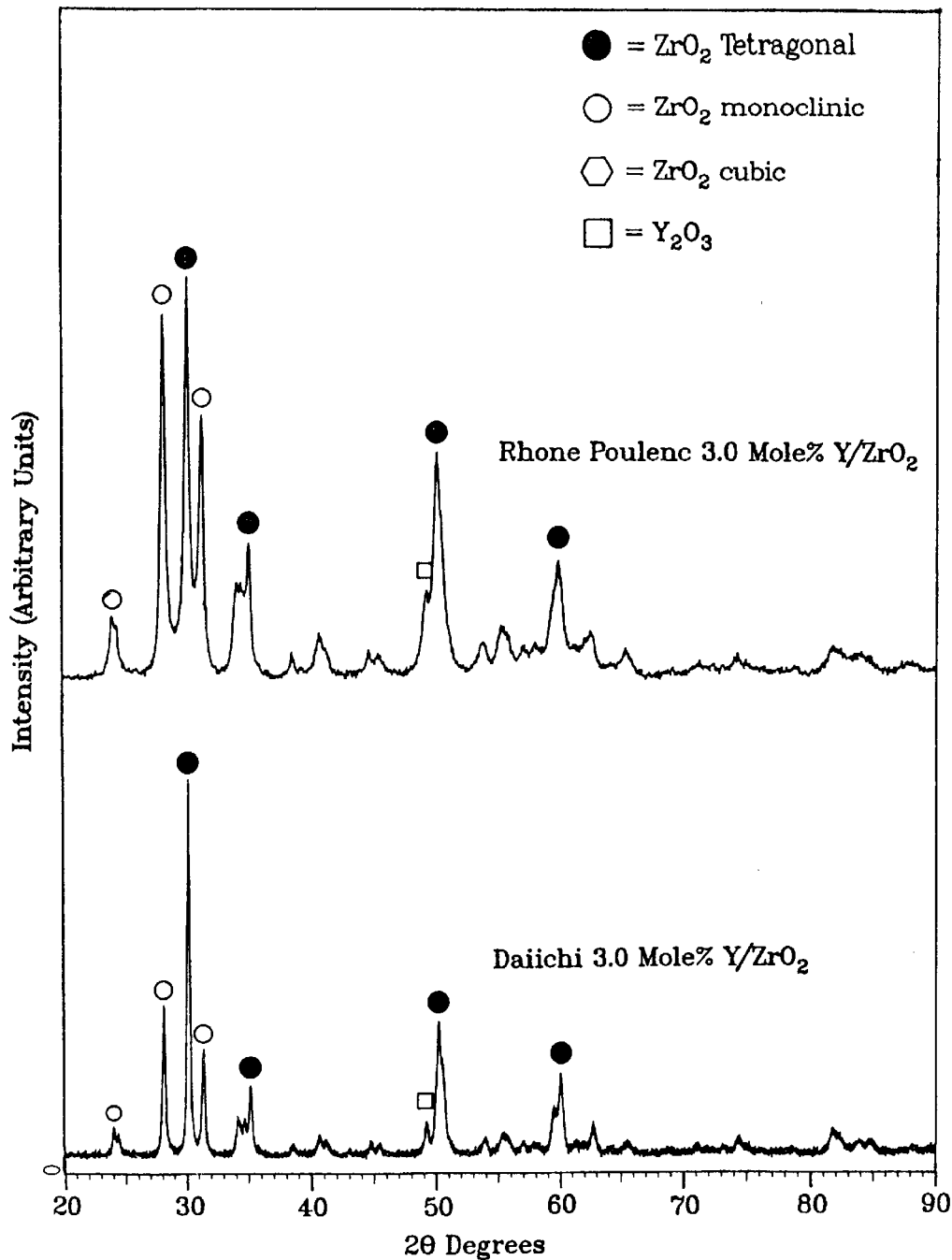

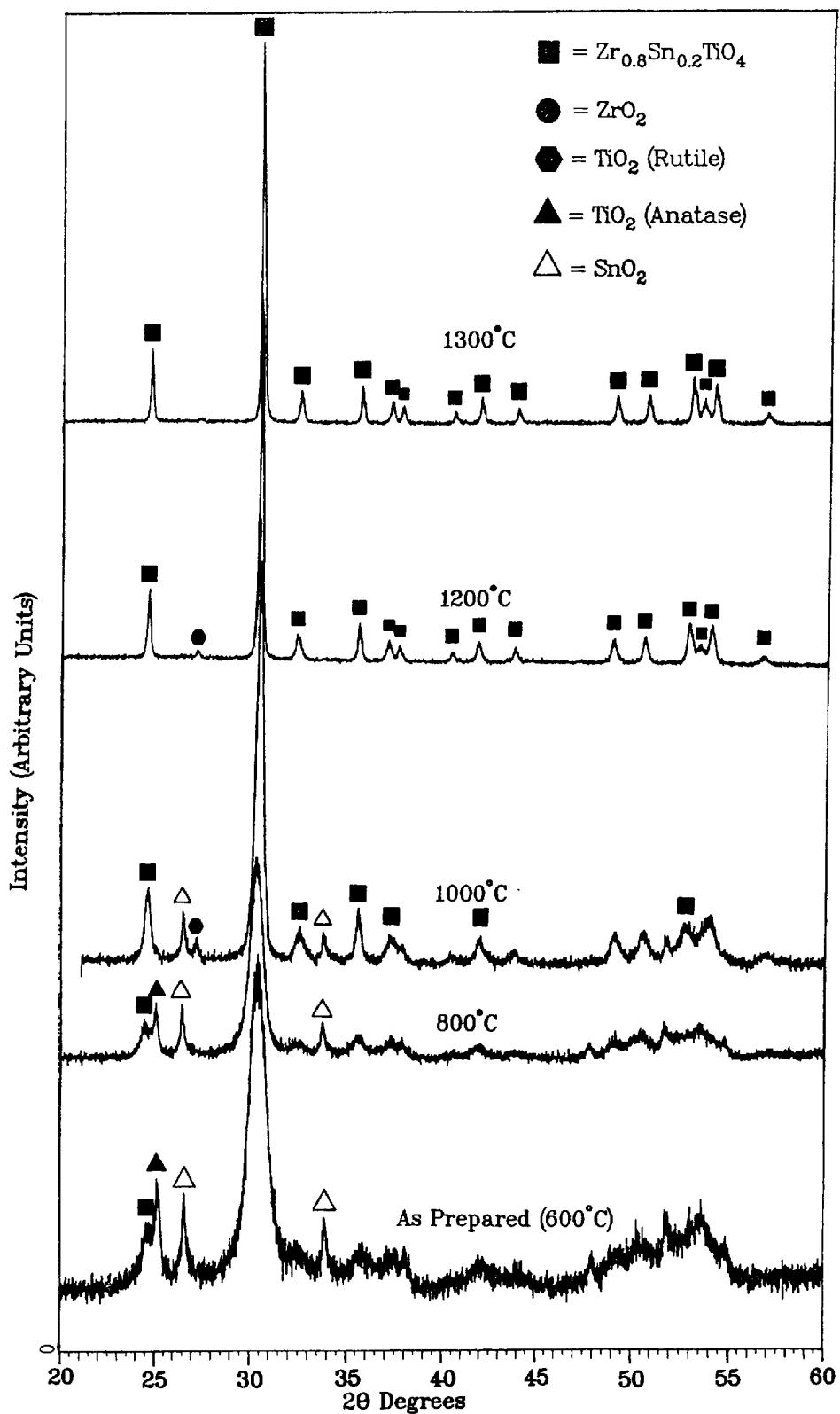
Figure 10. XRD patterns of $Zr_{0.8}Sn_{0.2}TiO_4$ prepared using the d-sorbitol process as a function of aging temperature

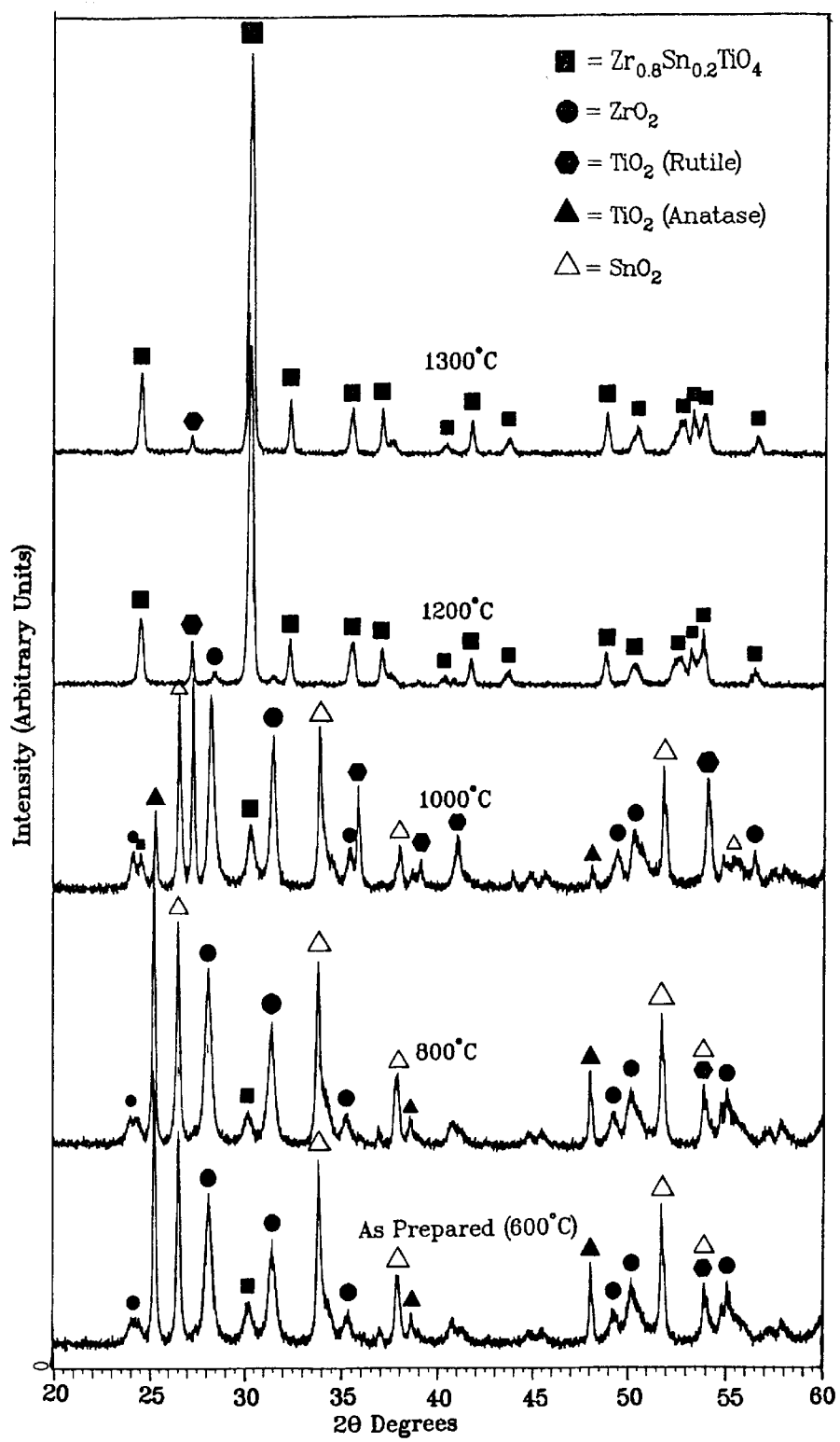
Figure 11. XRD patterns of $Zr_{0.8}Sn_{0.2}TiO_4$ prepared using a state-of-the-art mixed oxide method as a function of aging temperature

METHODS FOR MAKING HIGHLY DISPERSED HOMOGENEOUS COMPOSITIONS

This application is a division of U.S. patent application Ser. No. 08/803,078, filed Feb. 20, 1997, pending, which claimed priority from U.S. Provisional Patent Application Ser. No. 60/012,014, filed Feb. 21, 1996, abandoned.

FIELD OF THE INVENTION

The present invention relates to the preparation of materials and coatings formed from compositions containing one or more metallic or metalloid components and, more particularly, to materials having uniform dispersion and/or homogeneity at the nanometer or sub micron scale when coated on a support or having uniform porosity and/or homogeneity when formed into solid articles.

BACKGROUND OF THE INVENTION

Recent demand for improved catalytic materials, improved films and/or coating multicomponent compositions with improved uniformity of dispersion and/or homogeneity have focused attention on the development of new procedures for preparing such materials and the new systems derived therefrom. Often, these new systems require superior uniform dispersion and greater control of the atomic homogeneity of the resulting material compositions. Such properties have become critical not only in such areas as catalyst preparation and manufacture, but also in chip construction and manufacture, metal oxide superconductor construction and manufacture, inorganic and/or metallic film coating preparation and manufacture, and low-temperature ceramic construction and manufacture.

Dispersion is an important consideration in catalytic systems where the size of catalytically active domains can and does cause changes in the catalytic activity and behavior. Dispersion is also important in film and/or coating processes where the film and/or coating is made by submitting a precursor material to post deposition treatments such as high temperature treatments, oxidation in an oxygen containing gas, reduction in hydrogen, or other such post deposition treatment.

Uniformity is important in all such applications because uniformity is a critical parameter in controlling the microscopic and macroscopic properties of the ultimate system. Uniformity contributes to the domain size and coverage qualities of coatings and depositions and contributes to the bulk and microscopic distribution of components in a multicomponent solid material.

Homogeneity is an important parameter as well because the ability to prepare compositions where the macroscopic stoichiometry of the components is faithfully reproduced on the microscopic scale (either nanometer or sub micron or atomic scale) can increase the effective compositional range of mixed component systems. Disruptions in the homogeneity of a composition can greatly attenuate or adversely affect the desired properties and characteristics of any article or material made from the composition.

Thus, it would be an advantage in the art to provide for easy, convenient, effective, and efficient methods for facilitating the formation of new uniformly dispersed and/or homogeneously distributed single or multi component compositions and materials, such as coatings and shaped articles, made from such compositions.

SUMMARY OF THE INVENTION

It is an object of the present invention to provide multi-component compositions and especially coatings and shaped articles made therefrom characterized by uniformity, high dispersion and/or homogeneity of the components at the nanometer or sub micron scale, or even at the atomic scale.

The compositions of the present invention and especially coatings and shaped articles made therefrom include inorganic, acidic, basic, metallic and/or metalloid components that are characterized by high uniformity, dispersion and/or homogeneity at the nanometer or sub micron scale, or even at the atomic scale.

It is a further object of the present invention to provide superior mixed oxides and mixed oxide compositions, supported and non-supported, that are characterized by nanometer or sub micron, or even atomic, uniformity of dispersion and homogeneity of the mixed oxides in the compositions.

It is also an object of the present invention to provide support compositions that are highly dispersed, uniform and homogeneous are resistant to component segregation and/or aggregation upon firing and/or high temperature exposure.

Another object of the present invention is to provide catalysts where the active catalytic sites are derived from depositing a composition on a support where the deposition results in highly uniform, highly dispersed, and/or homogeneous catalytic sites on and in the support and where the highly dispersed catalytic sites are resistant to component segregation and/or aggregation during post formation treatments.

The present invention also provides a method for making the compositions; for making supports out of the compositions; for making supports having highly dispersed, uniform, and/or homogeneous compositions dispersed thereon; for making mixed oxide compositions and coatings; and for making supported catalysts from the compositions.

The method of this invention includes first preparing a mixture, preferably a solution, of suitable precursors of the desired components in the presence of at least one matrix-forming organic compound reagent. The mixtures can be formed into a desired shape or can be coated or impregnated onto a suitable support or support structure at this point. The shapes, coated support, and/or impregnated supports can then be further treated to produce a desired product. Alternatively, the mixture itself may be directly subjected to further treatment. The further treatment contemplated involves at least two separate operations, which may optionally be conducted at the same time. The first operation is to form the matrix without causing precipitation or agglomeration of, or otherwise affecting the distribution of, the precursor constituents that are contained within the mixture. This may be accomplished by any suitable manner, most conveniently by controlled driving off of the solvent for the organic reagent, as by heating or by applied vacuum. The resultant product may be formed into a shaped article or made into a coating at this point as well. Thereafter, the matrix material must be eliminated, without substantially affecting the distribution of the precursor constituents. This is conveniently accomplished by means of heat and/or fire, during which the precursor compounds may also be oxidized.

BRIEF SUMMARY OF THE DRAWINGS

For a more complete understanding of the present invention and the features and advantages thereof, reference is now made to the Detailed Description in conjunction with the attached Drawings, in which:

FIG. 1 shows a TEM picture of 10 wt. % Zr on $\gamma\text{-Al}_2\text{O}_3$ prepared from ZrO acetate after air calcination at 600° C.

FIG. 2 shows TEM pictures of Rh/10 wt. % $\text{Zr}/\gamma\text{-Al}_2\text{O}_3$ catalyst prepared by impregnating the alumina with ZrO nitrate after aging at 1200° C. for 6 hours in 10% $\text{H}_2\text{O}$/90% $\text{N}_2$.

FIG. 3 shows a TEM picture of 12 wt. % Zr on γ-Al$_2$O$_3$ prepared from ZrO nitrate with the inclusion of citric acid after air calcination at 600° C.

FIG. 4 shows SEM pictures of Nextel fibers evenly coated with boron nitride prepared from boric acid with the inclusion of sorbitol.

FIG. 5 shows SEM pictures of silica fibers evenly coated with Y stabilized ZrO$_2$ prepared from Zr chloride and Y acetate with inclusion of d-sorbitol.

FIG. 6 shows a TEM picture of Ba,Ce/Al$_2$O$_3$ prepared from Ba acetate, Ce colloid and alumina sol with the inclusion of d-sorbitol after air calcination at 600° C.

FIG. 7 shows a TEM picture of La,Ce/Al$_2$O$_3$ prepared from La acetate, Ce colloid and alumina sol with the inclusion of d-sorbitol after air calcination at 600° C.

FIG. 8 shows the XRD patterns of Y stabilized ZrO$_2$ prepared using ZrOCl$_2$, Y acetate and d-sorbitol after pyrolysis at 600° C., and after calcination at 800° C., 1000° C. and 1200° C.

FIG. 9 shows the XRD patterns of commercial Y stabilized ZrO$_2$ supplied by Daiichi and by Rhone-Poulenc.

FIG. 10 shows the XRD patterns of zirconium tin titanate prepared using TiOSO$_4$, ZrOCl$_2$, SnCl$_4$ and d-sorbitol after pyrolysis at 600° C. and after calcination at 800° C., 1000° C., 1200° C. and 1300° C.

FIG. 11 shows the XRD patterns of zirconium tin titanate prepared using the state-of-the-art mixed oxide procedure after calcination at 600° C., 800° C., 1000° C., 1200° C. and 1300° C.

DETAILED DESCRIPTION OF THE INVENTION

The inventors have found that, with the use of a suitable matrix-forming organic compound or reagent containing at least two hydroxy and/or carboxy groups, combined with compatible solutions of one or more appropriate components and/or precursors of predetermined components, highly improved and novel products can be made. The methods of the present invention can effectively be used to produce: (1) uniform oxide or mixed oxide coatings on an inert support of either high or low surface area; (2) supports with the components highly and uniformly dispersed thereon; (3) new supports with any desired stoichiometry of components homogeneously distributed throughout the support at the nanometer or sub micron scale, or even atomic scale; (4) new homogeneously distributed mixed oxide compositions; (5) new homogeneously distributed ceramics; (6) new catalysts with the catalytically active sites uniformly and highly and/or homogeneously dispersed (for multi-component systems) on a support; (7) new mixed metal oxide superconductors; (8) ceramic composites where oxidation resistant interface coatings applied to continuous ceramic fibers are required; (9) new oxide coated silica spheres; (10) new homogeneous films of 1-2-3-, Y,Ba,Cu oxide superconductors; (11) new homogeneous mixed metal oxides, perovskites, and doped ionic conductors; (12) ceramic dielectric materials for ceramic capacitors and ceramic microwave filters, and microwave ferrite devices; and (13) high strength oxide structural ceramic materials for high temperature structural applications such as ceramic turbine engines.

Employment of the present invention in the preparation of multi-component mixtures such as slurries, sols, dispersions, or solutions can result in the formation of catalysts, catalyst coatings, catalyst films, ceramics, ceramic films, ceramic coatings, ceramic superconductors, and ceramic superconductive coatings having nearly complete multi-component homogeneity at the nanometer or sub micron, and even at the atomic scale, as measured by X-ray diffraction (XRD), Energy Disperson Spectroscopy (EDS), Scanning Electron Microscopy (SEM), Transmission Electron Microscopy (TEM), and Scanning Transmission Electron Microscopy (STEM) Characterization. Dispersion, homogeneity and uniformity of the component(s) at the nanometer or sub micron scale means that the average domains or crystallite size of the components is on the order of 100 Å or less as measured by SEM, TEM, STEM, or EDS; dispersion, homogeneity and uniformity of the component(s) at the atomic scale means that the composition's macroscopic composition is reproduced at its atomic scale as measured by SEM, TEM, STEM, or EDS; homogeneity means that the bulk composition is reproduced throughout the composition as measured by XRD, SEM, TEM, STEM and temperature programmed reduction analysis (TPR), and other analytical techniques; and uniformity means that the domains are uniformly distributed throughout the composition and that the homogeneity is manifest uniformly throughout the composition.

The method of the present invention generally begins with the preparation of a mixture containing one or more components and at least one matrix-forming organic reagent, as will be described. The mixture, preferably a solution, can be aqueous or non-aqueous, but the solvent or solvents used must be capable of dissolving or suspending the components and the organic reagent(s) and allowing them to readily associate in a generally homogeneous composition distributed throughout the mixture. Such mixtures, in the form of slurries, dispersions or solutions containing two or more components can either be used directly, that is, without further modification, to form mixed component compositions or they may be first deposited on a suitable substrate by impregnation or coating. The mixed component compositions and/or the substrate on which they have been deposited (provided that the substrate is powdered) can then be formed into a shape and subjected to various post forming treatments such as drying and calcining in air, inert gases, or active gases such as hydrogen, ammonia, water, mixtures thereof or the like or other post formation treatments.

The method of the present invention can also be repeated or combined. Thus, a support can be coated with a single component or mixed component solution and then impregnated and/or coated with a second solution. Additionally, a mixed component form can be prepared and subsequently coated or impregnated by another metal solution.

Suitable applications for the compositions of the present invention include those that require the deposition of one or more components, coating, films or the like on the surface of high or low surface area substrate or support material as well as the formation of new compositions, supports, substrates, catalysts, and the like.

The present invention describes a general procedure for the application of metals, metal salts and/or complexes and/or their oxides to the surfaces of high and low surface area supports whereby the metal salts and/or metal oxides are highly dispersed, uniformly deposited, and/or homogeneously dispersed on the support. The deposition of these components can be achieved by contacting the support with any appropriate aqueous or non-aqueous mixture and preferably a slurry, sol or solution containing a metal compound such as a metal salt or complex in the presence of at least one organic reagent having at least two hydroxy and/or carboxy groups.

Mixed metal oxides that can be formed using the methods of the present invention using two or more metal salts with the only criteria being that the organic reagent and the salts be compatible or soluble in the solvent used to make the metal mixture or solution.

In the case of catalysts, the deposition of highly dispersed catalytically active agents such as inorganics, acids, bases, metals, metallic compounds or complexes or the deposition of highly dispersed, homogeneous multi-catalytic components or catalytically active agents on high surface area supports can enhance catalytic activity, catalyst durability, and other properties.

Such catalytically active components or agents can include, without limitation, any one or more compounds derived from an element in the Periodic Table of Elements that can manifest catalytic properties under suitable conditions such as systems that include at least one metallic component or another type of catalytically active component.

To prepare catalysts according to the method of the present invention, a mixture and preferably a slurry, dispersion or solution containing at least one catalytically active agent such as a metal containing compound and at least one organic compound containing at least two hydroxy and/or carboxylic acid groups is simply impregnated or coated onto a support in a single or multiple impregnating or coating steps. The impregnated or coated support can then be dried and/or calcined to produce a support having small scale catalytically active domains evenly dispersed thereon where the domain sizes (which can be crystallites) are generally below about 100 Å and preferably below about 50 Å as measured by X-ray diffraction. Ideally, for single component catalytic agents, it is preferred that the catalytic agents be atomically dispersed on the support. By atomic dispersion, the inventors mean that each catalytically active site has a single catalytic agent localized on the surface and separated from other catalytically active sites.

Alternatively, the impregnated or coated support can be subjected to various catalyst conditioning processes such as oxidation, reduction, sintering, fusion, and the like depending on the ultimate use to which the catalyst composition is to be put. For catalytic applications such as hydrogenation, Fischer-Tropsch reactions, hydroformylation, and hydrotreating, the catalysts may have to be in a reduced state whereas for hydroforming, catalytic cracking, exhaust gas treatment and the like, the catalyst may have to be in an oxidized state.

For multi-component catalytic systems, multiple mixtures containing one or more metal compounds or other catalytic agents and at least one organic compound containing at least two hydroxy and/or carboxy groups, can be impregnated or coated onto the support in a single or multiple impregnation or coating steps, dried and/or calcined to produce a catalyst having highly dispersed domains or layers of different catalytically active agents or components. This technique can be repeated as many times as desired to achieve catalysts with multiple catalytic sites or to produce highly dispersed catalytic sites with closely associated co-catalytic sites readily available or to produce multi-layered structures where each layer is characterized by high, uniform and/or homogeneous dispersion of the components in each layer. This same multiple application technique can also be used to prepare new layered composites or laminates.

In ceramic applications, such as the formation of ceramic fiber/ceramic matrix composites, homogeneous oxides, nitrides or carbides can be used as interface coatings on ceramic fibers to prevent reactions between the fiber and matrix that could lead to the formation of brittle characteristics, making the composite undesirable in materials for structural applications. For such coatings, it is generally required that the oxide, nitride or carbide precursors evenly coat the fibers and provide a highly homogeneous ceramic coating without fiber bridging once processed at elevated temperatures. Conventional preparation methods such as sol gel coating lead to uneven coatings that exhibit varying degrees of fiber bridging. Often exotic techniques, such as chemical vapor deposition, are required to produce the desired coatings. The latter procedures, however, are prohibitively expensive and time consuming, thus making them often impractical for commercial applications.

To prepare a ceramic powder, a ceramic film or a ceramic coating according to the methods of the present invention, a suitable mixture (preferably a solution, sol or slurry) containing the appropriate precursors is either dried (for ceramic powders) or coated onto an appropriate substrate such as a support, fiber, film, laminate or other similar structure, and then dried. The suitable mixture includes at least one appropriate ceramic precursor, generally a metallic compound, and one or more suitable organic compounds containing at least two, and preferably more than two, hydroxy and/or carboxy groups, as will be described. The dried material is then calcined to decompose the organic compound and form a ceramic material characterized by small scale homogeneity of the ceramic precursors. This process is especially well suited to produce mixed metal oxide, electronic ceramic composites and low temperature mixed metal oxide superconductor materials. To prepare a ceramic where the individual ceramic grains are surface enriched with a desired metallic element, using the present invention, a mixture (preferably a slurry) including the desired ceramic grains (powder), at least one metallic compound, and one or more organic compounds containing at least two and preferably more than two, hydroxy and/or carboxy groups is either formed into a given shape or dried to form a powder cake. The shape or cake is dried then fired or calcined to yield the desired ceramic article or powder. The surface enriched ceramic powders can be used in a variety of forming techniques to prepare monolithic or laminate ceramic articles for structural or electronic ceramic applications. The same process can be used to make any desired shape of a mixed oxide ceramic material.

The Matrix-Forming Organic Reagent

The most important feature of a suitable organic reagent according to the present invention is that it form a viscous, fairly rigid, molasses-like gel or rigid film when solvent is removed during subsequent evaporation and/or drying steps. Moreover, this gel or film should remain in the form of a semi-rigid matrix up to the point at which it decomposes or is combusted during subsequent treatment, such as calcination. Therefore, any organic reagent or combination of organic reagents that exhibit these physical characteristics should be effective. However, those reagents that tend to be liquid at room temperature or which evaporate quickly when heated will generally not be as effective in the practice of the present invention.

In addition to these physical characteristics, it is also important that the reagent selected be generally compatible with the desired components or precursor thereof, in the sense that they do not cause or promote precipitation, separation or aggregation of such components or precursors during the formation, application, drying and/or subsequent post treatment steps.

Suitable organic reagents for use in the methods of the present invention include organic reagents that contain at least two carbon atoms and at least two hydroxy and/or carboxy or carboxylic acid groups. Preferred organic reagents include, without limitation, polyols, sugars, saccharides, or polysaccharides, carboxylic acids including hydroxy carboxylic acids, amino acids, and their carboxylic acid derivatives such as carboxylate salts, amides, esters, thioesters, or the like or polyamines or mixtures thereof.

Examples of suitable carboxylic acids, amino acids and hydroxy carboxylic acids include, without limitation, dl-citric, dl-tartaric, dl-lactic, aspartic, malic, malonic, succinic and glutamic acids, threonine, serine, asparagine, glutamine, lysine, arginine, histidine, cysteine or the like, or mixtures thereof. Preferred carboxylic acids include carboxylic acids having both a carboxylic acid group and another group capable of: (1) hydrogen bonding such as OH, OR, $NH_2$, NHR, COR, CHO, $NR_2$, $PR_2$, or the like (where R is any alkyl, aryl, alkaryl, or arylalkyl group); (2) ionic bonding such as $R_3N^+$, $R_3P^+$, $BX_3^-$, $SO_3^-$ or similar charged groups (where R is any alkyl, aryl, alkaryl, or arylalkyl group, and X is a halogen atom); or (3) electrostatic or dipole interactions such as $NO_2$, CN, F, Cl, COR, CHO, OR, $NR_2$, $PR_2$, or the like.

Examples of suitable polyols, sugars, saccharides, and polysaccharides include, without limitation, sorbitol, mannitol, oligomers of vinyl alcohol, glucose, dl-ribose, galactose, fructose, erythrose, threose, arabinose, xylose, erythrulose, ribulose, xylulose, psicose, maltose, lactose, sucrose, raffinose, melezitose, or other C5 and C6 sugars, or the like, or derivatives of such sugars such as N-acetylmuramic acid, N-acetylneuraminic acid, or the like. Of course, either optically active isomer of these reagents as well as mixtures of any of these reagents can be used.

The inventors have found that while citric acid and other similar carboxy containing organic reagents appear to be suitable for certain classes of metal salts such as metal nitrates, these reagents may not be suitable for all applications. The inventors believe that organic reagents with more alcoholic groups than carboxy groups may have more general application than organic reagents with more carboxy groups than alcoholic groups. Thus, the preferred organic reagents for general application include, without limitation, polyols, sugars, saccharides, polysaccharides or their derivatives or other polyol molecules. Of course, polyamines and/or mixed polyol-amines may also be reagents of general applicability.

Particularly effective polyols include, without limitation, those monosaccharides, sugars, and polysaccharides with at least five carbon atoms, and mixtures thereof. These polyols are generally inexpensive and non-toxic and are also readily soluble in water as well as a wide range of organic solvents.

The particularly preferred polyols are linear polyols having at least one hydroxy group attached to each carbon atom, with linear polyols having at least six carbon atoms such as sorbitol and mannitol being especially preferred. Linear polyols are the most preferred organic reagents because all the C—C bonds of these polyols are single bonds allowing relatively free rotation about the bonds, thereby allowing the molecules to assume a large number of conformations to accommodate a given component. Furthermore, the presence of at least one hydroxy group on each carbon atom coupled with the free rotation, appears to maximize intermolecular interaction, such as hydrogen bonding, between the reagent and contained components such as a metal salt and/or support surfaces. These characteristics make these polyols very effective at producing uniform, highly dispersed, and even atomically dispersed, components such as metal compounds on the surface of a support or, in the case of ceramic or ceramic coatings, uniform and/or homogeneous compositions.

A further advantage of polyols, such as sorbitol and mannitol, is that these organic reagents can be contacted with a wide range of components including metal salts without precipitation or differential precipitation occurring. Unlike citric or tartaric acid, which do not prevent differential precipitation, and resultant metal segregation, of certain mixed components such as metal acetate salts or sols of a wide range of metals such as Al, Ce, La, Zr, Mg, etc., polyols, such as sorbitol and mannitol, appear to inhibit precipitation and differential precipitation resulting in the formation of uniform highly dispersed metal compositions.

The use of the organic reagents set forth above in the practice of the present invention has definite advantages over other preparation methods for forming mixed metal components such as precipitation. Precipitation or co-precipitation of mixed metal components such as oxides, for example, can result in segregation of the metal components because generally, the metal ions do not precipitate at exactly the same rate. Thus, the methods of the present invention, particularly the use of polyols, such as sorbitol, are especially dictated in applications where very uniform and homogeneous intermixing of the metal ions or complexes is of key importance. Examples of such applications include the preparation of the 1-2-3, Y,Ba,Cu superconductors where conventional preparation methods invariably result in some segregation of components, the preparation of solid state ionic conductors, and the preparation of perovskites and other mixed oxide crystallites for catalysis applications.

Moreover, it has also been found that to be suitable for use in the present invention the organic reagents must undergo complete combustion during calcination, leaving very little carbon residue. Polyols such as sorbitol leave essentially no organic residue after calcination.

The organic reagents and particularly polyols such as sorbitol are important because these reagents appear to trap individual compositional components such as metal ions or complexes in some type of film or matrix during concentration of the mixture during drying. In the case of polyols, polyol-amines or polyamines, the film or matrix is thought to be an hydrogen bonded matrix. However, the matrix could equally well consist of a variety of intermolecular interactions between the organic reagents, the components and/or any support surface. The matrix formation is thought to allow for an essentially atomic intermixing of the components such as metal ions and greatly facilitates the formation of homogeneous compositions such as mixed-metal oxides after post preparation treatments, such as calcination or firing.

The organic reagents are thought to facilitate matrix formation by first binding to, associating with or complexing with the components such as metal ions in the mixture, as in a solution. This interaction is thought to inhibit premature or differential precipitation of the components during the formation, application and/or drying processes. Premature or differential precipitation generally leads to large and/or small scale inhomogeneity in the resulting compositions both during the formation, application, and/or drying processes. Finally, the extensive intermolecular hydrogen bonding, electrostatic and/or ionic interactions between (1) the organic molecules themselves, (2) the components and/or (3) the support surface, if present, appears to result in the formation of a film, matrix, or coating of the organic reagent within which the components are highly, if not atomically, dispersed and uniformly and/or homogeneously distributed.

The matrix, film, or coating on a substrate in which the dopants, generally metal ions, are highly or even atomically dispersed, is thought to facilitate the deposition of uniform, highly dispersed and/or homogeneously dispersed single and/or multi-component systems or evenly deposited films, coatings, or overlays. Additionally, the mixture can be concentrated and formed in a mold. While drying the mixture will form a rigid matrix in which the components are trapped. Firing of this matrix, then, results in the formation of a homogeneous unitary shape of the components.

For effective formation of compositions of this invention, including mixed component compositions or composites or for good dispersion of the component(s) on a support, the mole ratio of organic reagent(s) to the component(s) will generally be between about 0.5 and about 5.0, but higher and lower ratios can be used. Preferably, the mole ratio of the organic reagent(s) to the component(s) will be between about 1 to about 4 with ratios between 1 and 3 being particularly preferred. However, the ratio must merely be sufficient to facilitate the formation of an organic matrix in which the components are homogeneously distributed.

After mixture formation, application and/or drying, the organic reagent can be burned out of the matrix by calcination in the presence of air or other oxygen containing atmospheres leaving an even dispersion of components such as metal oxides on the surface of the support or other substrates. The thickness of the film or matrix will, of course, depend on the application and can vary from less than a monolayer (separated, highly dispersed islands or domains) to as much as several millimeters thick or more. Of course, the mixture can be applied in one or many application steps.

The Components for Use in the Present Invention

Suitable components that can be uniformly, highly dispersed and/or homogeneously mixed in the presence of one or more organic reagents of the present invention, include, metal compounds or complexes, metalloid compounds, non-metal compounds, acids and bases and other components that can bond with the organic reagent.

Exemplary, but non-limiting, metalloid compounds include: boron compounds such as boric acid, boric anhydride, boron alkoxides, carboranes, mixtures thereof, or the like; silicon compounds such as silicas, silica sols, silicon-carbides, mixture thereof, or the like; Ge reagents; As reagents; Te reagents; and At reagents; and mixtures of all these components.

Exemplary, but non-limiting, non-metal compounds, acids and/or bases, include carbon compounds, nitrogen compounds, phosphorus compounds, sulfur compounds, selenium compounds and/or halogen compounds that are capable of interacting effectively with the organic reagents. Such compounds include: nitrogen compounds such as amines, imines, nitric acid, nitrous acids, or the like mixtures thereof, carbon compounds such as carbonates; phosphorus compounds such as phosphates, phosphites, phosphonates, phosphines, thiophosphates, thiophosphonates, phosphoramids, PN polymers and oligomers, polycyclic PN compounds, or the like, or mixtures thereof; sulfur compounds such as thiols, disulfides, polysulfides, sulfates, sulfuric acid, sulfonic acid, sulfenates, sulfinates, sulfurous acids, or the like, or mixtures thereof; selenium compounds such as selenic acid, selenous acid or the like, or mixtures thereof; and halogen compounds such as halides, perchlorates, perbromates, periodates, metal halide salts, or the like, or mixtures thereof; or mixtures of all these components.

Metal oxides or metals and mixed metal oxides or metals that can be formed using the methods of the present invention include one or more metal salts with the only criterion being that the organic reagent and the salt be soluble in the solvent used to make the metal solution. Suitable metal(s) from which metal containing mixtures can be prepared in accordance with this invention include, without limitation, Li, Na, K, Rb, Cs, Fr, Be, Mg, Ca, Sr, Ba, Ra, Sc, Y, La, Ac, Ti, Zr, Hf, V, Nb, Ta, Cr, Mo, W, Mn, Tc, Re, Fe, Ru, Os, Co, Rh, Ir, Ni, Pd, Pt, Cu, Ag, Au, Zn, Cd, Hg, Al, Ga, In, Tl, Sn, Pb, As, Sb, Bi, Se, Te, Po, At, Ce, Pr, Nd, Pm, Sm, Eu, Gd, Tb, Dy, Ho, Er, Tm, Yb, Lu, Th, Pa, U, and the transuranium elements as well. Suitable metal salts or complexes include, without limitation, halide salts, sulfate and sulfite salts, nitrate and nitrite salts, organic acid salts such as acetate salts, chlorate and chlorite salts, and any other soluble metal salts and complexes.

Suitable mixtures of components useful in this invention include, without limitation, slurries, dispersions, sols, solutions, other similar mixtures, or mixtures thereof. These mixtures can be in solvents or solvent systems such as water, alcohols, ethers, ketones, or the like or mixtures thereof; provided, of course, that the components and organic reagents can associate with each other in the solvent or solvent system. Preferred solvents and solvent systems, include, without limitation, water, lower alcohols, lower ketones, furans (THF), mixtures thereof, or the like. Preferably, the components and the reagents will be soluble in the solvent or solvent system. Of course, one of ordinary skill in the art will recognize that any solvent or solvent system can be used provided the solvent or solvent system is capable of allowing the component(s) and the organic reagent(s) to associate with each other and of forming the containment matrix described above.

Suitable supports for use in the present invention include without limitation, non-zeolitic solid inorganic oxides such as alumina, silica, boria, oxides of phosphorus, titanium dioxide, zirconium dioxide, chromia, zinc oxide, magnesia, calcium oxide, silica-alumina, silica-magnesia, silica-alumina-magnesia, silica-alumina-zirconia, chromia-alumina, alumina-boria, silica-zirconia, boro-silicates, etc. and the various naturally occurring inorganic oxides of various states of purity such as bauxite, clay, diatomaceous earth, boehmite, etc. The preferred inorganic oxide supports include silicas, amorphous silicon dioxide, alumina, aluminum oxides, silica-aluminas, and mixtures thereof.

Catalytically active components include, without limitation, any one or more compounds derived from an element in the Periodic Table of Elements, preferably where at least one of the components is a transition metal. Group VIII metals and mixtures containing Group VIII metals are particularly well-suited for the preparation of catalysts and catalytic coatings.

Rare earth metals and mixtures containing rare earth metals are particularly well suited for the preparation of catalyst promoters and modified supports. Other components, including metal components or mixtures containing them, can be used in semi-conductor modification, support modification, catalyst preparation, or the like.

To prepare catalysts according to the method of the present invention, a solution containing one or more catalytically active agents, such as metal containing compounds, and at least one organic reagent containing at least two hydroxy and/or carboxy groups is simply impregnated onto a support in a single impregnation step. The impregnated support can then be dried and calcined to produce a support having small scale catalytically active domains evenly dispersed thereon where the domain sizes (which can be crystallites) are generally below about 100 Å and preferably below about 50 Å and particularly below about 35 Å as measured by XRD, STEM and TEM. In certain applications, the catalytically active agents can be atomically dispersed on the support.

Alternatively, the impregnated support can be subjected to various catalyst conditioning processes such as oxidation, reduction, fusion, or the like depending on the ultimate use to which the catalyst composition is to be put. For catalytic applications such as hydrogenation, Fisher-Tropsch reactions, and hydrotreating, the catalysts may have to be in a reduced state whereas for hydroforming catalyst, catalytic cracking catalyst, exhaust gas treatment or the like, the catalyst may have to be in an oxidized state.

The following examples are designed to illustrate the preparation of the compositions of the present invention. In all of the examples described below, the general calcination procedure used was as follows: the temperature of a muffle furnace fitted with nitrogen and air feed lines was initially ramped to 150° C. at 2.5° C./minute, held at 150° C. for 2 hours and then ramped to 500– 600° C. at 2–5° C./minute. The feed rate of air or various air/nitrogen mixtures was held constant at 2 liters/minute.

Preparation of Support Containing Highly Dispersed Metal Compounds

EXAMPLE 1

This example illustrates the preparation of a highly dispersed nickel oxide on a fumed silica support using d-sorbitol as the organic reagent.

47.1 grams of nickel acetate tetrahydrate were added to 700 grams of deionized water, stirred until dissolved. To this solution, were added 68.9 grams of d-sorbitol and the solution again stirred until the d-sorbitol was dissolved. 50 grams of fumed silica were then added slowly while stirring to give a uniform slurry. This slurry was then transferred to an evaporator and evaporated to dryness oven a 24 hour time period. The dried powder was calcined at 600° C.

The resultant calcined powder was then analyzed by XRD and transition electron microscopy (TEM). These analyses showed that the crystallite sizes for the current preparation were appreciably smaller than preparations made in the absence of sorbitol as described below in Example C1. From the XRD analysis, the crystallite sizes were found to be about 64 Å for the (111) and (200) reflections. In the case of the TEM analysis, the crystallite sizes were in the range of 40 Å–70 Å.

COMPARATIVE EXAMPLE C1

This comparative example illustrates the preparation of a normally dispersed (i.e., in the absence of d-sorbitol) nickel oxide on a fumed silica support.

47.1 grams of nickel acetate tetrahydrate were added to 700 grams of deionized water and stirred until dissolved. While continuously stirring this solution, 50 grams of fumed silica were slowly added. After addition of all the silica, the resultant slurry was stirred for 10 minutes and then transferred to an evaporator and evaporated to dryness over a 24 hour time period. The dried powder was calcined in air for 6 hours at 600° C.

The resultant calcined sample was then analyzed by XRD and TEM. The XRD analysis showed the presence of NiO crystallites and the average crystallite size was measured using the Scherrer method which showed an average size of 116 Å and 121 Å for the (111) reflection and (200) reflection, respectively. TEM analysis showed that the crystallite sizes were in the range of 90 Å–150 Å which was in good agreement with the XRD results.

EXAMPLE 2

This example illustrates the preparation of a highly dispersed copper oxide on high surface area support using citric acid as the organic reagent.

100.9 grams of anhydrous citric acid were added to 450 grams of deionized water and stirred until dissolved. To this solution, were added 63.4 grams of $Cu(NO_3)_2.3H_2O$ and the mixture again stirred until dissolved. 150 grams of $\gamma$-$Al_2O_3$ (surface area $\geq 200$ $m^2/g$) were then added slowly with stirring to give a uniform slurry. This was then transferred to an evaporator and evaporated to dryness over a 6 hour time period. The resultant dried powder was then calcined in air at 500° C. for 6 hours. TEM analysis of this sample showed that the morphology was very different from a sample prepared without the presence of citric acid as described in comparative Example C2. The analysis showed very little segregation of the copper oxide with most of it present as well-dispersed fine particles of 100 Å–200 Å in size.

COMPARATIVE EXAMPLE C2

This comparative example illustrates the preparation of a normally dispersed (i.e., in the absence of citric acid) copper oxide on high surface area support.

63.4 grams of copper nitrate ($Cu(NO_3)_2.3H_2O$) were added to 450 grams of deionized water, stirred and dissolved. To this solution were slowly added 150 grams of $\gamma$-$Al_2O_3$ (surface area $\geq 200$ $m^2/g$) to give a uniform slurry. The resultant slurry was transferred to an evaporator and evaporated to dryness over a 6 hour time period. The powder was then calcined in air at 500° C. for 6 hours. TEM analysis of the above powder showed that the copper oxide was poorly dispersed and consisted of large segregated lumps of copper oxide or hydroxides on the alumina surface. The particle sizes were in the range of 2,000 Å–4,000 Å.

COMPARATIVE EXAMPLE C3

This comparative example illustrates the preparation of zirconium oxide on high surface area support using a conventional technique with ZrO acetate as the Zr source.

102.3 grams of zirconyl acetate solution (approx. 22 wt % $ZrO_2$) supplied by Magnesium Elektron Inc. were added to 500 grams of deionized water and stirred to give a uniform mixture. To this mixture were added 150 grams of $\gamma$-$Al_2O_3$ (surface area $\geq 200$ $m^2/g$) with stirring to give a uniform slurry. The resultant mixture was transferred to an evaporator and evaporated to dryness over a 24 hour time period. A sample of the powder was sent for TEM analysis which showed that the $ZrO_2$ had poor dispersion and was highly segregated. The $ZrO_2$ was either concentrated into large islands or else formed a thick coating around the alumina particles.

COMPARATIVE EXAMPLE C4

This comparative example illustrates the preparation of zirconium oxide on high surface area support using a conventional technique with ZrO nitrates as the Zr source.

28.2 grams of $ZrO(NO_3)_2.XH_2O$ (FW=231.23) were dissolved in 800 grams of deionized water. 85 grams of high surface area $\gamma$-$Al_2O_3$ were then added to give a slurry which was transferred to an evaporator and evaporated to dryness over a 5 hour time period. The resultant dried powder was then calcined at 600° C. for 6 hours in air. The powder was then impregnated with Rh at a loading of 0.15 wt. % and finally aged at 1140° C. for 6 hours in 10% steam/90% nitrogen at a flow rate of 0.5 liters/minute. TEM analysis of the resultant sample showed that the $ZrO_2$ was highly segregated as in the zirconyl acetate impregnation in Example C3. Again the $ZrO_2$ was segregated into large clusters or formed a thick layer around the alumina particles.

FIGS. 1 and 2 show TEM pictures for the compositions of Comparative Examples C3 and C4; FIG. 1 shows the TEM for ZrO acetate impregnation and FIG. 2 shows the TEM for $ZrO(NO_3)_2$ impregnation. The TEMs show that the Zr has segregated extensively for both preparations.

EXAMPLE 4

This example illustrates the preparation of a highly dispersed zirconium oxide on a γ-alumina support using citric acid as the organic reagent.

51.84 grams of $ZrO(NO_3)_2 \cdot XH_2O$ (FW=231.23, Aldrich product # 24,349-3) were added to 400 grams of deionized water followed by 10 grams of conc. nitric acid. The resultant solution was heated to 75–80° C. and stirred until all the $ZrO(NO_3)_2$ was dissolved and a clear solution was obtained. 86.13 grams of anhydrous citric acid were then added to this solution and stirred until dissolved. The resultant solution was transferred to a blender and 150 grams of γ-$Al_2O_3$ (SA≧200 $m^2/g$) were added slowly with stirring. The resultant slurry was transferred to an evaporator and evaporated to dryness over a 6 hour time period. The dried powder was then calcined at 600° C. in a 2% oxygen/98% nitrogen mixture for 6 hours and sent for XRD and TEM analysis.

The XRD analysis showed only the presence of broad $ZrO_2$ peaks indicating that the $ZrO_2$ was amorphous or very highly dispersed in nature. TEM analysis did not detect any segregated $ZrO_2$ as found in the earlier samples described in Comparative Examples C3 and C4. Instead the $ZrO_2$ was found to be highly dispersed with the particles being too small for particle size measurement. Further, EDS analysis showed that the Zr was evenly dispersed throughout the sample with the Zr/Alumina ratio being roughly constant in all areas analyzed.

FIG. 3 shows the TEM pictures for the composition of Example 4. EDS analysis showed that the Zr was evenly dispersed on the support with no evidence of segregation at alumina grain boundaries. XRD analysis of the composition of Example 4 showed broad peaks for $ZrO_2$ indicative of the presence of very small $ZrO_2$ crystallites.

EXAMPLE 5

This example illustrates the preparation of a highly dispersed zirconium oxide on a γ-alumina support using citric acid as the organic reagent.

A zirconium/citric acid solution was prepared as follows: 1500 grams of $ZrO(NO_3)_2 \cdot XH_2O$ (FW=231.23) were added to 5060 grams of deionized water. 224 grams of conc. nitric acid were then added to this solution and stirred with heating on a hot plate until nearly all of the $ZrO(NO_3)_2$ had dissolved. 1453 grams of anhydrous citric acid were then added and the resultant solution stirred for 0.5 hours.

870 grams of this solution were then transferred to a blender and 300 grams of θ-$Al_2O_3$ were added with stirring to give a uniform slurry. The resultant slurry was milled for 10 minutes using an Eiger mill Type M250-VSE-EXP and was then transferred to a flat pan and dried for 2 days at 110° C. The dried powder was then calcined in a muffle furnace at 600° C. for 12 hours in a flow of 4% oxygen/96% nitrogen.

TEM analysis of the resultant powder was carried out to determine the morphology and degree of zirconium oxide dispersion. It was found that the $ZrO_2$ was highly dispersed and uniformly covered the alumina surface. No segregation into large clusters around the alumina particles was observed. Accurate crystallite sizes could not be measured due to interference from the alumina but the sizes were estimated to be appreciably smaller than 150 Å.

Preparation of Supports Coated with Evenly Dispersed Metal Compounds

In the preparation of coated low surface area supports, solutions of the same wt. % loading as those used for a high surface area support, produce a thick overlayer, several hundred Å thick. A number of coated compositions made using the method of the present invention show improved and more even coating when the organic reagent is employed than when it is not.

EXAMPLE 6

This example illustrates the preparation of evenly dispersed coatings of boron nitride on the surfaces of ceramic fibers such as Nextel™ 440 alumina borosilicate fibers.

1 gram of boric acid and 8 grams of d-sorbitol were dissolved in 92 grams of deionized water. The solution was heated in a water bath at 100° C. and stirred with a magnetic stir bar until a clear solution was obtained. 1 inch×1 inch swatches of Nextel™ 440 fiber plain weave fabric were dipped in the solution and allowed to dry. After drying, the coated fabrics were heat treated in a tube furnace at 1000° C. in an atmosphere of pure ammonia for 1 hour. The samples were cooled to room temperature in the tube furnace under the ammonia atmosphere.

Examination revealed that a shiny grey coating was deposited on the fibers of the fabric. X-ray photoelectron spectroscopy analysis (XPS) indicated the presence of boron nitride coating on the Nextel™ 440 fibers. The results of the analysis are given in Table 1 below:

TABLE 1

| Surface Composition of a Nextel ™ 440 Fabric Coated with Boron Nitride as Described in Example 6. | | | | | |
|---|---|---|---|---|---|
| Al | Si | B | N | O | C |
| 12.70% | 5.48% | 15.25% | 12.2% | 35.27% | 18.18% |

FIG. 4 shows the Nextel™ 440 fibers of Example 6 coated with boron nitride. The SEMs show very even coating of the boron nitride after pyrolysis.

EXAMPLE 7

This example illustrates the preparation of evenly dispersed coatings of zirconium, yttrium mixed metal oxide on the surfaces of low surface area supports such as Almax™ and Nextel™ 610 alumina fiber.

60.56 grams of $ZrOCl_2 \cdot 8H_2O$, 10 grams of $Y(C_2H_3O_2)_3 \cdot 4H_2O$ and 82.16 grams of d-sorbitol were dissolved in 100 grams of deionized water. The solution was stirred with a magnetic stir bar at room temperature until a clear solution was obtained.

One inch samples of both Almax™ and Nextel™ 610 fibers were dipped into the above solution for one minute then dried for 30 minutes at room temperature. The fibers were placed in a furnace and fired in air using the following cycle: heat from room temperature to 80° C. at 1° C./minute and soak for 3 hours; heat from 80 to 900° C. at 2° C./minute and soak for 1 hour; cool to room temperature at the natural furnace cooling rate. The samples were characterized using SEM to verify the presence of the coating.

FIG. 5 shows SEM pictures of the coated alumina fibers of Example 7 where the coating is $ZrO_2/Y$ (8% Y).

EXAMPLE 8

This example illustrates the preparation of evenly dispersed coatings of zirconium dioxide on the surfaces of low surface area silica using citric acid as the organic reagent.

51.84 grams of $ZrO(NO_3)_2 \cdot XH_2O$ were added to 400 grams of deionized water that had been acidified with 13 grams of conc. nitric acid. The resultant solution was heated to 75–80° C. and stirred until the $ZrO(NO_3)_2$ had dissolved. 86.13 grams of anhydrous citric acid were added and stirred to give an opaque colored solution. This was transferred to a blender and 150 grams of silica were added with stirring to give a slurry. During the silica addition more water was added as needed to keep the slurry from forming a thick gel that could not be stirred. The resultant slurry was transferred to an evaporator and evaporated to dryness over a 24 hour time period. The dried slurry was then calcined in a 2% oxygen/98% nitrogen mixture at 600° C. for 6 hours. A sample of the powder was then analyzed using XRD. It was found that the $ZrO_2$ peaks were broad indicating that the $ZrO_2$ crystallites were very small or that the $ZrO_2$ was amorphous in nature. This composition showed similar properties to the Zr alumina composition of Example 5.

Other applications of the present technology include coating of fully dense $SiO_2$ spheres with various metal oxides.

Preparation of Homogeneous Mixed Metal Oxides

EXAMPLE 9

This example illustrates the preparation of $ZrO_2/CeO_2$ mixed oxides using d-sorbitol as the organic reagent.

280.2 grams of $Ce(NO_3)_3$ solution (18.8 wt. % cerium) were added to 300 grams of deionized water in a 2 liter beaker. 158.6 grams of $ZrO(NO_3)_2 \cdot XH_2O$ (Aldrich Product # 34,646-2) was then added followed by 291.5 grams of d-sorbitol (Aldrich Product # S375-5). The resultant mixture was gently heated and 20.9 grams of conc. nitric acid added to facilitate dissolution of the $ZrO(NO_3)_2$. The mixture was then transferred to a forced air drying oven and dried for 2 days at 120° C. The resultant gel was calcined at 600° C. for 5 hours in a flow 4% oxygen/96% nitrogen @ 2 liters/min and then at 600° C. for 1 hour in air.

EXAMPLE 10

This example illustrates the preparation of $La/Al_2O_3$ mixed oxides using d-sorbitol as the organic reagent.

204.00 grams of lanthanum acetate solution (6.31 wt. % lanthanum) were added to 1163 grams of aluminum acetate sol (4.3 wt. % aluminum, supplied by American Cyanamid Company) and stirred to give a homogeneous mixture. 709 grams of d-sorbitol were dissolved in 1200 grams of deionized water and then combined with the lanthanum acetate/aluminum acetate mixture. The above mixture was heated to 80° C. and stirred for 5 hours. It was then transferred to an evaporator and evaporated to a gel over 5 hours. The resultant gel was calcined at 600° C. in 2% oxygen/98% nitrogen at a flow rate of 2 liters/minute for 6 hours.

EXAMPLE 11

This example illustrates the preparation of $Ba,CeO_2$, $Al_2O_3$ mixed oxides having a starting ingredient ratio in grams of 26.7:169:1000; barium acetate:cerium sol:alumina using d-sorbitol as the organic reagent.

384.8 grams of d-sorbitol were dissolved in 1000 grams of water. 26.7 grams of barium acetate were then added and dissolved followed by 169 grams of cerium colloid sol (14.8 wt. % cerium). The resultant mixture was stirred for 10 minutes. 1000 grams of Vista alumina sol (Product Name DISPAL 23N4-20; 20 wt. % $Al_2O_3$) were then added and the mixture stirred for 24 hours. It was then transferred to a ceramic dish and dried in a forced air oven at 120° C. for 2 days. The resultant gel was calcined in a flow of 4% oxygen/96% nitrogen at a flow of 2 liters/minute at 600° C. for 6 hours.

EXAMPLE 12

This example illustrates the preparation of $Ba,CeO_2$, $Al_2O_3$ mixed oxides having a starting ingredient ratio in grams of 26.7:169:1000; barium acetate:cerium sol:alumina using d-sorbitol as the organic reagent.

647 grams of d-sorbitol were dissolved in 1000 grams of deionized water. 24.8 grams of Ba acetate were then added and dissolved followed by 190.9 grams of cerium colloid (14.8 wt. % cerium). The resultant mixture was stirred for 10 minutes. 500 grams of Vista alumina sol (Product Name DISPAL 23N4-20; 20 wt. % $Al_2O_3$) was then added and the resultant mixture stirred for 3 hours. It was then transferred to a ceramic dish and dried in a forced air oven for 12 hours. The resultant gel was calcined as described in Example 11.

EXAMPLE 13

This example illustrates the preparation of $La,CeO_2$, $Al_2O_3$ mixed oxides having an approximate weight ratio of 14:25:104 (La:Ce:Al) using d-sorbitol as the organic reagent.

392 grams of d-sorbitol were dissolved in 1000 grams of deionized water. 222 grams of lanthanum acetate (6.3 wt. % lanthanum) were then added followed by 169 grams of cerium colloid (14.8 wt. % cerium). The resultant mixture was stirred for 5 minutes and 1000 grams of Vista alumina sol (Product name DISPAL 23N4-20; 20 wt. % $Al_2O_3$) were added and then stirred for 24 hours. The resultant mixture was transferred to a ceramic dish and dried and calcined as described in Example 11.

EXAMPLE 14

This example illustrates the preparation of $La,CeO_2$, $Al_2O_3$ mixed oxides having an approximate metal weight ratio of 17:28:52 (La:Ce:Al) using d-sorbitol as the organic reagent.

656 grams of d-sorbitol were dissolved in 1000 grams of deionized water. 267 grams of lanthanum acetate (6.3 wt. % lanthanum) were then added followed by 191 grams of cerium colloid 14.8% cerium. The resultant mixture was stirred for 5 minutes and 500 grams of Vista alumina sol (Product Name DISPAL 23N4-20; 20 wt. % $Al_2O_3$) were then added and stirred for 3 hours. The resultant mixture was transferred to a flat ceramic dish and dried and calcined as described in Example 12 above.

For the preparations of Examples 11, 12, 13 and 14 both the $CeO_2$ and $Al_2O_3$ used were in the form of sols, but very high dispersions were still achieved as shown in FIGS. 6 and 7. The results show that the CeO$_2$ crystallites are every evenly dispersed, and no evidence was found for Ba or La segregation based on EDS analysis.

EXAMPLE 15

This example illustrates the preparation of a La doped CeO$_2$ mixed oxide ionic conductor using d-sorbitol as the organic reagent.

116 grams of lanthanum nitrate solution (24 wt. % lanthanum) and 596 grams of cerium nitrate solution (18.8 wt. % cerium) were added to 1000 grams of deionized water. 364 grams of d-sorbitol were then added and the solution stirred until all the d-sorbitol was dissolved. The mixture was then heated and stirred on a hot plate until the total volume was reduced to 1 liter and then transferred to an evaporator and evaporated to a viscous gel over a time period of 24 hours. The resultant gel was then calcined in two stages. It was initially calcined at 450° C. for 2 hours in air, at a flow rate of 2 liters/minute, followed by air calcination at 600° C. for 6 hours in flowing air at 2 liters/minute.

EXAMPLE 16

This example illustrates the preparation of a lanthanum strontium chromite material which can be used to fabricate solid oxide fuel cell element interconnects using d-sorbitol as the organic reagent.

145.23 grams of La(NO$_3$)$_3$.5H$_2$O, 174.92 grams of Cr(NO$_3$)$_3$.9H$_2$O, 17.99 grams of Sr(C$_2$H$_3$O$_2$)$_2$, and 150 grams of d-sorbitol were dissolved in 1000 grams of deionized water. The solution was stirred until clear then poured into a glass dish and dried in an oven at 105° C. for 5 hours. The dried material (a brittle cellular mass easily crushed by hand) was pulverized and calcined at 600° C. for 3 hours. The resultant material was a green powder composed of an amorphous phase and lanthanum chromite (by XRD). The powder was wet milled using deionized water and high purity zirconia media for 5 hours to break up agglomerates and was then dried.

EXAMPLE 17

This example illustrates the preparation of a tetragonal phase 3.0 m/o yttria stabilized zirconium oxide material using d-sorbitol as the organic reagent.

312.54 grams of ZrOCl$_2$.8H$_2$O and 20.27 grams of Y(C$_2$H$_3$O$_2$)$_3$.4H$_2$O were dissolved in 520 grams of 70 wt. % solution of d-sorbitol in water. The solution was heated in a water bath at 10° C. and stirred with a magnetic stir bar until a clear solution was obtained. The solution was placed in a drying oven and dried at 150° C. for 16 hours. After drying, the resultant gel was pyrolyzed using the following furnace cycle: ramp from room temperature to 350° C. at 5° C./minute; soak for two hours; ramp to 600° C. at 5° C./minute; soak for five hours; cool to room temperature at natural furnace cooling rate.

Samples of the resultant powder were calcined at 800° C., 1000° C., and 1200° C. for three hours then examined by X-ray powder diffraction (XRD). FIG. 8 shows the XRD pattern of the material after pyrolysis and the XRD patterns after calcination at 800° C., 1000° C. and 1200° C. As can be seen in the figure, a single phase 3 m/o yttria stabilized tetragonal zirconia material was obtained as pyrolyzed and after calcination at all three temperature settings. FIG. 9 shows XRD patterns of commercially available materials from Daiichi and Rhone-Poulenc. As can be seen, the commercial material contains secondary phases indicating an insufficiently stabilized material which is subject to destructive phase instabilities upon processing into a finished article. The material prepared using this invention does not contain these secondary phases and is thus fully stabilized.

EXAMPLE 18

This example illustrates the preparation of a Zr$_{0.8}$Sn$_{0.2}$TiO$_4$ material using d-sorbitol as the organic reagent.

121.08 grams of TiOSO$_4$.2H$_2$O, 128.89 grams of ZrOCl$_2$.8H$_2$O, 35.07 grams of SnCl$_4$.5H$_2$O, and 520 grams of 70% d-sorbitol solution were dissolved in 100 grams of deionized water. The solution was heated in a water bath at 100° C. and stirred with a magnetic stir bar until a clear solution was obtained. The solution was placed in a drying oven and dried at 150° C. for 16 hours. After drying, the resultant gel was pyrolyzed using the following furnace cycle: ramp from room temperature to 350° C. at 5° C./minute; soak for two hours; ramp to 600° C. at 5° C./minute; soak for five hours; cool to room temperature at natural furnace cooling rate.

Samples of the resultant powder were calcined at 800° C., 1000° C., 1200° C., and 1300° C. for three hours then examined by X-ray powder diffraction (XRD). FIG. 10 shows the XRD patterns of the material after pyrolysis and after calcination at 800° C., 1000° C., 1200° C. and 1300° C. As can be seen from the XRD patterns, zirconium tin titanate is the major phase at 600° C. and the amounts of reactants tin oxide and titanium oxide are reduced as the calcination temperature is increased. At 1300° C., only a trace of tin oxide remains, the major phase being zirconium tin titanate.

Comparing these results to those of a material prepared using state of the art mixed oxide techniques currently employed in the manufacture of zirconium tin titanate (prepared in-house), it is found that the materials of the present invention are substantially better and unique. The XRD patterns of material using currently employed techniques are shown in FIGS. 11. As can be seen from the XRD patterns, only a minor amount of zirconium tin titanate is formed at 600° C. and as the calcination temperature is increased, the amount of reactants is reduced, but to a much smaller extent than the material prepared using the present invention. This implies a lower cost in production since lower calcining temperatures are required to form single phase zirconium tin titanate using the method of the present invention.

Other electronic materials such as lanthanum strontium manganite, lanthanum calcium cobalt chromite, lanthanum calcium manganite and other rare earth doped zirconium oxide and cerium oxide ceramic electrolytes can also be prepared using the method of the present invention.

In addition, ceramic dielectric materials such as barium titanate, zirconium tin titanate, rare earth or alkaline earth titanates and rare earth iron garnets and mixed oxide ferrites can be prepared using the method of the present invention.

Important new structural ceramic materials such as yttrium aluminum garnet, and zirconia toughened alumina can also be prepared using this process.

Preparation of Dispersed Precious Metal Supported Catalysts

EXAMPLE 19

This comparative example illustrates the preparation of Pd impregnated on a commercial Ce, Zr, La, and Ba containing support in the absence of an organic reagent.

100 grams of a commercial Ce,Zr,La,Ba/θ-Al$_2$O$_3$ support were sieved to 20–40 mesh size. 1.414 grams of Pd as palladium nitrate was added to 200 grams of deionized water. This solution was then transferred to an evaporator and the 100 grams of Ce,Zr,La,Ba/θ-Al$_2$O$_3$ support were added rapidly and then evaporated to dryness. The resultant catalyzed support was calcined in a Despatch oven using a standard calcination procedure.

The fresh light-off performance of the above material was evaluated in a laboratory reactor using a standard synthetic exhaust gas mixture. The gas composition consisted of CO, CO$_2$, C$_3$H$_6$, C$_3$H$_8$, H$_2$, H$_2$O, NO, O$_2$SO$_2$ and N$_2$. Testing involved heating the catalysts in the exhaust gas at 5° C./min. to 600° C. and measuring the conversion of CO, HC and NOx as a function of catalyst inlet temperature according to the testing procedure described in J. G. Nunan, H. J. Robota, M. J. Cohn, S. A. Bradley, *Physiochemical Properties of Ce-Containing Three-Way Catalysts and the Effect of Ce on Catalyst Activity*, J. Catal. 1992, 133, 309.

EXAMPLE 20

This example illustrates the preparation of a Pd impregnated on a commercial Ce, Zr, La, and Ba containing support in the presence of citric acid.

The preparation in Example 19 was repeated and in this case citric acid was included with the Pd nitrate during the impregnation step according to the present invention. The mole ratio of citric acid/Pd was 5. The catalyst was then evaluated as described in Example 19. The results are presented in Table 2 below. It is apparent that the catalyst prepared using the methods of the present invention shows superior light-off performance.

TABLE 2

Temperature at 50% Conversion for a Pd/Ce,Zr,La,Ba/θ-Al$_2$O$_3$ Catalyst Prepared With and Without the Inclusion of Citric Acid

| Citric Acid | Temperature (° C.) at 50% Conversion | | |
| --- | --- | --- | --- |
| | HC | CO | NOx |
| No | 215 | 190 | 200 |
| Yes | 185 | 145 | 129 |

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

We claim:

1. A method of making a thermally-decomposable matrix containing at least one inorganic component uniformly and homogeneously distributed throughout the matrix comprising combining an amount of at least one organic matrix-forming reagent selected from the group consisting of those organic reagents in which the sum of the number of hydroxy and carboxy groups contained therein is at least two, an amount of said at least one inorganic component and a solvent that is capable of suspending the inorganic component and the organic matrix-forming reagent; mixing, thereby forming a uniform suspension; and thereafter, removing the solvent by means that avoids causing precipitation or agglomeration of the at least one inorganic component, thereby forming a matrix comprising organic molecules cross-linked by hydrogen bonding, ionic bonding, or electrostatic or dipole interactions so that relative movement among such molecules is impeded.

2. The method of claim 1 wherein the organic reagent is selected from the group consisting of those organic reagents in which the sum of the number of hydroxy and carboxy groups contained therein is at least three.

3. The method of claim 1 wherein the organic reagent is selected from the group consisting of those organic reagents in which the sum of the number of hydroxy and carboxy groups contained therein is at least four.

4. The method of claim 1 wherein the organic reagent is selected from the group consisting of polyols, sugars, saccharides, polysaccharides, carboxylic acids, hydroxycarboxylic acids and mixtures thereof.

5. The method of claim 1 wherein the organic reagent is a linear polyol having at least six carbon atoms and having at least one hydroxy group on each carbon atom.

6. The method of claim 1 wherein the organic reagent is selected from the group consisting of sorbitol and mannitol.

7. The method of claim 1 wherein the organic reagent is citric acid.

8. The method of claim 1 wherein the at least one inorganic component is selected from the group consisting of metal compounds, metal complexes, metalloid compounds, non-metallic compounds, acids, bases, and mixtures thereof.

9. A method of making a multi-component solid composition, the components of which are uniformly and homogeneously distributed throughout the composition, comprising:

a) combining suitable amounts of precursor compounds of the components of said composition and at least one matrix-forming organic reagent selected from the group consisting of those organic reagents in which the sum of the number of hydroxy and carboxy groups contained therein is at least two in a sufficient amount of a solvent that is capable of suspending the components and the organic reagent and mixing, thereby forming a substantially homogeneous and uniform mixture;

b) removing the solvent by means that avoids precipitation or agglomeration of the precursor compounds, thereby forming a matrix comprising organic molecules cross-linked by hydrogen bonding, ionic bonding, or electrostatic or dipole interactions so that relative movement among such molecules is impeded and precursor compounds; and thereafter c) decomposing the rigid matrix to leave a solid composition;

d) treating the solid composition to effect transformation of the precursor compounds to the desired components.

10. The method of claim 9 further including the step of thoroughly mixing the substantially homogeneous and uniform mixture of step a) with particles of a suitable support prior to removing the solvent.

11. The method of claim 9 wherein the substantially homogeneous and uniform mixture of step a) is dispersed on a suitable support before the removing the solvent.

12. The method of claim 9 wherein steps c) and d) are carried out at the same time.

13. The method of claim 9 wherein the decomposing step c) is carried out in the presence of sufficient heat and oxygen to oxidize the precursor compounds and step d) is deleted.

14. The method of claim 9 wherein the organic reagent is selected from the group consisting of those organic reagents in which the sum of the number of hydroxy and carboxy groups contained therein is at least three.

15. The method of claim 9 wherein the organic reagent is selected from the group consisting of those organic reagents in which the sum of the number of hydroxy and carboxy groups contained therein is at least four.

16. The method of claim 9 wherein the organic reagent is selected from the group consisting of polyols, sugars, saccharides, polysaccharides, carboxylic acids, hydroxy-carboxylic acids and mixtures thereof.

17. The method of claim 9 wherein the organic reagent is a linear polyol having at least six carbon atoms and having at least one hydroxy group on each carbon atom.

18. The method of claim 9 wherein the organic reagent is selected from the group consisting of sorbitol and mannitol.

19. The method of claim 9 wherein the organic reagent is citric acid.

20. The method of claim 9 wherein the at least one inorganic component is selected from the group consisting of metal compounds, metal complexes, metalloid compounds, non-metallic compounds, acids, bases, and mixtures thereof.

* * * * *